United States Patent
Lv

(10) Patent No.: US 8,813,161 B2
(45) Date of Patent: Aug. 19, 2014

(54) METHOD FOR TRANSMITTING AND RECEIVING SERVICE DATA OF HANDSET TV

(75) Inventor: Yong Lv, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/130,696

(22) PCT Filed: Nov. 25, 2008

(86) PCT No.: PCT/CN2008/073190
§ 371 (c)(1),
(2), (4) Date: Jul. 8, 2011

(87) PCT Pub. No.: WO2010/060240
PCT Pub. Date: Jun. 3, 2010

(65) Prior Publication Data
US 2011/0265141 A1    Oct. 27, 2011

(51) Int. Cl.
| H04N 5/06 | (2006.01) |
| H04N 5/445 | (2011.01) |
| H04N 7/00 | (2011.01) |
| H04N 11/00 | (2006.01) |
| G06F 15/16 | (2006.01) |
| G06F 15/173 | (2006.01) |

(52) U.S. Cl.
USPC ............. 725/133; 348/521; 348/563; 348/24; 709/231; 709/238

(58) Field of Classification Search
CPC .......... H04N 21/4312; H04N 21/8586; H04N 21/8126; H04N 21/435
USPC ........... 725/9, 133, 6; 375/260; 709/231, 238; 348/521, 24, 563
See application file for complete search history.

(56) References Cited

U.S. PATENT DOCUMENTS 3,988,528 A * 10/1976 Yanagimachi et al. ......... 348/24
7,389,318 B2 * 6/2008 Yoshida et al. ............... 709/200
(Continued)

FOREIGN PATENT DOCUMENTS

| CN | 1682206 A | 10/2005 |
| CN | 1960485 A | 5/2007 |

(Continued)

OTHER PUBLICATIONS

European Search Report issued in European Application No. 08878358.4 dated Jul. 30, 2013.

*Primary Examiner* — Pankaj Kumar
*Assistant Examiner* — Tariq Gbond
(74) *Attorney, Agent, or Firm* — Venable LLP; Robert Kinberg

(57) ABSTRACT

A method for transmitting service data of a handset TV is disclosed in the present invention, wherein, an audio part and a video part of a handset TV program are split into an audio sub-service and a video sub-service respectively, and when transmitting the service data of the handset TV program, a transmitting terminal splits the service data into audio sub-service data and video sub-service data; the transmitting terminal respectively transmits the audio sub-service data and the video sub-service data on different transmission resources, and transmits association relationship information of the audio sub-service and the video sub-service to a terminal. In the present invention, a transceiver operates in a DRX mode in a long time to effectively save the handset power energy; in addition, in implementation, the present invention only needs to update the software in the existing system, which causes very small changes to the system and is low in cost, thus the overall performance of the handset TV is effectively improved.

7 Claims, 2 Drawing Sheets

(56) References Cited

U.S. PATENT DOCUMENTS

| | | |
|---|---|---|
| 7,512,698 B1 * | 3/2009 | Pawson ................. 709/231 |
| 2003/0133043 A1 * | 7/2003 | Carr ...................... 348/563 |
| 2005/0008034 A1 * | 1/2005 | Merkle et al. ........... 370/470 |
| 2007/0016405 A1 * | 1/2007 | Mehrotra et al. ........ 704/203 |
| 2008/0259213 A1 * | 10/2008 | Yoshida et al. ......... 348/521 |
| 2009/0007194 A1 * | 1/2009 | Brady et al. ............ 725/77 |
| 2009/0220015 A1 * | 9/2009 | Fu et al. ................. 375/260 |
| 2009/0222848 A1 * | 9/2009 | Ramaswamy ........... 725/9 |
| 2010/0050214 A1 * | 2/2010 | Funabiki et al. ........ 725/81 |
| 2012/0179835 A1 * | 7/2012 | Morris et al. ........... 709/238 |

FOREIGN PATENT DOCUMENTS

| | | |
|---|---|---|
| CN | 101197992 A | 6/2008 |
| CN | 101282464 A | 10/2008 |
| EP | 1768409 A1 | 3/2007 |
| GB | 2443235 A | 4/2008 |
| WO | WO-01/33856 A1 | 5/2001 |
| WO | WO-2004/056096 A1 | 7/2004 |

* cited by examiner

METHOD FOR TRANSMITTING AND RECEIVING SERVICE DATA OF HANDSET TV

FIELD OF THE INVENTION

The present invention relates to the field of handset TV, in particular to a method for transmitting and receiving service data of a handset TV.

BACKGROUND OF THE INVENTION

A rapid development is witnessed in handset TV (mobile multimedia broadcast) technologies and standards, such as a DVB-H (Digital Video Broadcast Handheld) in Europe, a MediaFLO (Media Forward Link Only) in USA, and a CMMB (China Mobile Multimedia Broadcasting) in China, etc.

The power consumption of a handset (mobile phone) is a strict constraint to any function of the handset. For the handset TV of any standard, the power consumption of the handset shall be considered at the beginning of the development. For example, both the CMMB and the DVB-H employ time-slicing technology to reduce the power consumption of the handset. In the time-slicing technology, a physical channel is split into several time slots according to time sequence, and data of different programs are packaged separately and transmitted in designated time slots. When a user selects to watch a certain program, a transceiver of the handset is actually in a discontinuous RX (DRX) state, that is, the transceiver only receives in the time slots occupied by the program selected by the user and does not need to work in other time slots, thus the power consumption of the transceiver is substantially reduced.

The handset TV organizes data in a unit of service. The service of the handset TV is used to bear TV programs and download data, wherein a TV program generally comprises two parts, an audio part and a video part. When a transmission terminal of the handset TV transmits service data, all the data of a program (comprising audio data, video data and synchronization information) are generally packaged in one data packet, time slots are allocated for the data packet according to a predetermined policy, and then the data packet is transmitted. When the user watches the program, a terminal receives the data packet and resolves it to obtain the audio data, the video data and the synchronization information for playing.

In practice, the user generally watches the handset TV in sporadic time intervals, for example, in a traveling vehicle. In these cases, the environment may be jolty or noisy, which is not suitable for the user to enjoy both the audio part and the video part of the program, thus the user may select to only listen to the audio part with the video part being shut down, or to only watch the video part with the audio part being shut down.

However, in the prior art, even the user selects to only play the audio part or the video part of the program, and correspondingly shut down the video part or the audio part, for the purpose of resolution, the terminal still needs to receive the whole data packet of the service data, which comprises a portion of data actually not required by the user, thus an unnecessary power consumption will occur to the terminal.

SUMMERY OF THE INVENTION

The technical problem to be solved by the present invention is to provide a method for transmitting and receiving the service data of the handset TV, so as to realize that when the user selects to only play the audio part or the video part of a program, the terminal correspondingly only receives the audio part or the video part of the program for the purpose of reducing power consumption.

In order to resolve the above technical problem, in the method for transmitting service data of a handset TV according to the present invention, an audio part and a video part of a handset TV program are split into an audio sub-service and a video sub-service respectively, and when transmitting the service data of the handset TV program, a transmitting terminal splits the service data into audio sub-service data and video sub-service data; the transmitting terminal respectively transmits the audio sub-service data and the video sub-service data on different transmission resources, and transmits association relationship information of the audio sub-service and the video sub-service to a terminal.

Further, when the terminal receives the service data of the program, if a user selects to only listen to an audio or only watch a video, then the terminal only receives the audio sub-service data or only receives the video sub-service data according to the received association relationship information; if the user selects to play the audio and the video simultaneously, the terminal receives both the audio sub-service data and the video sub-service data according to the received association relationship information.

Further, the transmitting terminal transmits transmission resource information of the audio sub-service and the video sub-service to the terminal before respectively transmitting the audio sub-service data and the video sub-service data, and the terminal receives the audio sub-service data and/or the video sub-service data according to the transmission resource information.

Further, the association relationship information employs a separate announcement or a combined announcement, wherein the separate announcement means that the audio sub-service and the video sub-service are respectively configured with guide information, an audio attribution and the video sub-service associated with the audio sub-service are indicated in the guide information of the audio sub-service, while a video attribution and the audio sub-service associated with the video sub-service are indicated in the guide information of the video sub-service; the combined announcement means that the program is configured with combined guide information, wherein whether the audio part and the video part of the program are split into the audio sub-service and the video sub-service is indicated in the combined guide information, if yes, the combined guide information further comprises service IDs for the audio sub-service and the video sub-service to identify the association relationship.

Further, when the user selects to play the audio and the video simultaneously, during the process of playing the program, if the user performs a silencing operation, the terminal only receives the video sub-service data according to the transmission resource information of the video sub-service data and plays the video sub-service data; if the user selects to shut down the video, the terminal only receives the audio sub-service data according to the transmission resource information of the audio sub-service data and plays the audio sub-service data.

Further, in a China Mobile Multimedia Broadcasting (CMMB) system, the transmission resources are transmission time slots of the audio sub-service data and the video sub-service data, and the process of respectively transmitting the audio sub-service data and the video sub-service data is: the transmitting terminal packages the audio sub-service data and the video sub-service data into different multiplex frames, and the multiplex frame packaged with the audio sub-service data and the multiplex frame packaged with the video sub-service data are transmitted respectively in different transmission time slots.

Further, the transmission resource information comprises transmission time slot information of the audio sub-service data and transmission time slot information of the video sub-service data, the transmitting terminal transmits the transmission resource information to the terminal through a continuous-service multiplex configuration table (CMCT);

when the user selects to only listen to the audio or only watch the video, the terminal searches the transmission time slot information of the audio sub-service data or the video sub-service data in the CMCT according to the service ID of the audio sub-service or the video sub-service contained in the association relationship information, and only receives the audio sub-service data or only receives the video sub-service data according to the transmission time slot information;

when the user selects to play the audio and the video simultaneously, the terminal searches the transmission time slot information of the audio sub-service data and the video sub-service data in the CMCT according to the service IDs of the audio sub-service and the video sub-service contained in the association relationship information, and receives the audio sub-service data and the video sub-service data respectively according to the transmission time slot information.

Further, the association relationship information is contained in an electronic service guide (ESG), and an audio sub-service ID field is added in the ESG to indicate the service ID of the audio sub-service; a video sub-service ID field is added to indicate the service ID of the video sub-service; and a service split indication field is added in the ESG to indicate whether the audio part and the video part of the program are split into the audio sub-service and the video sub-service.

Further, when a terminal receives the service data of a handset TV program, if a user selects to only listen to an audio or only watch a video, then the terminal only receiving respectively transmitted audio sub-service data or video sub-service data of the program according to received association relationship information; if the user selects to play the audio and the video simultaneously, the terminal receiving both the audio sub-service data and the video sub-service data of the program according to the received association relationship information.

Further, in a China Mobile Multimedia Broadcasting (CMMB) system, when the user selects to only listen to the audio or only watch the video, the terminal searches transmission time slot information of the audio sub-service data or the video sub-service data in a received continuous-service multiplex configuration table (CMCT) according to a service ID of an audio sub-service or a video sub-service contained in the association relationship information, and only receives the audio sub-service data or only receives the video sub-service data according to the transmission time slot information;

when the user selects to play the audio and the video simultaneously, the terminal searches transmission time slot information of the audio sub-service data and the video sub-service data in the CMCT according to service IDs of the audio sub-service and the video sub-service contained in the association relationship information, and respectively receives the audio sub-service data and the video sub-service data according to the transmission time slot information.

Based on the above description, in the present invention, the audio part and the video part of a handset TV program are transmitted respectively, the terminal only receives the audio part of the terminal when the user selects to only play audio, and only receives the video part of the program when the user selects to only play video, thus the transceiver operates in a DRX mode in a long time to effectively save the handset power energy; in addition, in implementation, the present invention only needs to update the software in the existing system, which causes very small changes to the system and is low in cost, thus the overall performance of the handset TV is effectively improved.

DETAILED DESCRIPTION OF PREFERRED EMBODIMENTS

In the embodiments of the present invention, an audio part and a video part of one program (a split program) are split into two independent sub-services, i.e., an audio sub-service and a video sub-service, the data of the two sub-services are selected to be transmitted on different transmission resources respectively, and splitting information of the audio sub-service and the video sub-service is sent to the terminal, wherein the splitting information comprises association relationship information and transmission resource information.

When the user selects to only play the audio part or the video part of the program, the terminal can only receive the audio sub-service data or the video sub-service data correspondingly and implement playing; when the user selects to normally play the program, the terminal receives both the audio sub-service data and the video sub-service data, and plays the audio part and the video part of the program simultaneously.

The embodiments of the present invention will be described below in connection with the drawings.

Figure 1:
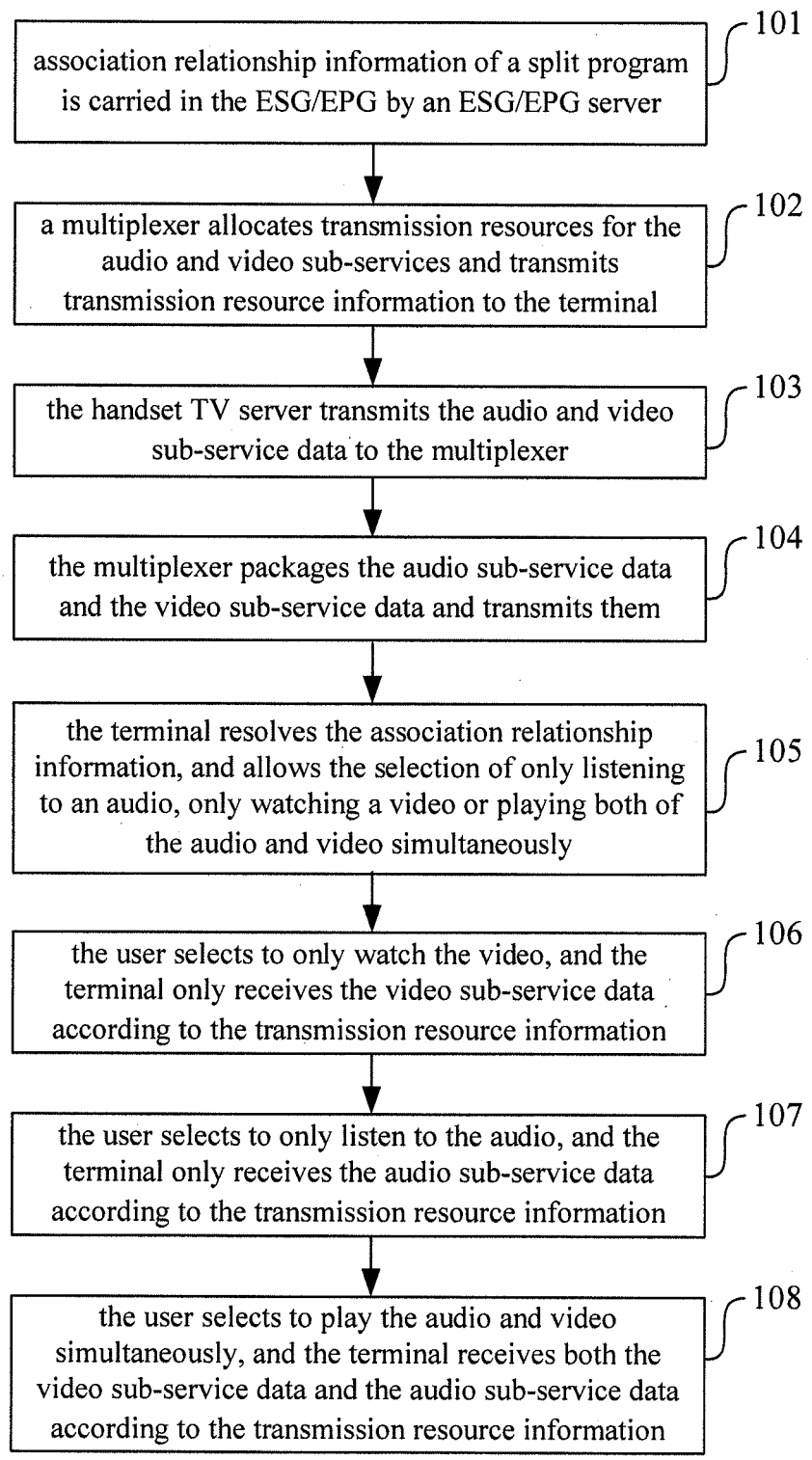
FIG. 1 is a flow chart of the method for transmitting the service data of the handset TV according to an embodiment of the present invention.

FIG. 1 shows the method for transmitting the service data of the handset TV according the embodiment of the present invention, and the method includes the following steps.

Step 101, at the transmitting terminal, when an ESG/EPG server is generating an ESG/EPG, association relationship information of the split program is carried in the ESG/EPG, and then the ESG/EPG is transmitted.

The association relationship information can employ a separate announcement or a combined announcement, wherein, the separate announcement means that the ESG/EPG contains guide information of the audio sub-service and the video sub-service respectively, and an audio attribution of the audio sub-service and the video sub-service associated with the audio sub-service are indicated in the guide information of the audio sub-service, while a video attribution of the video sub-service and the audio sub-service associated with the video sub-service are indicated in the guide information of the video sub-service. The guide information of the audio sub-service and the video sub-service also contains synchronization information required by synchronously playing the audio sub-service and the video sub-service respectively.

The combined announcement means that the ESG/EPG only contains combined guide information, wherein the combined guide information indicates whether the program is a split one, if yes, the combined guide information also contains information identifying association relationship, such as the service IDs of the audio sub-service and the video sub-service. The combined guide information shall also contain the synchronization information required for synchronously playing the audio sub-service and the video sub-service.

Step 102: the multiplexer at the transmitting terminal allocates different transmission resources for the audio sub-service and the video sub-service of the split program, and dispatches the transmission resource information of the audio sub-service and the video sub-service to the terminal.

For example, in the CMMB, the above transmission resources comprise the transmission time slots and the multiplex frames corresponding to the service; in the DVB-H, the transmission resources comprise the transmission time slots, etc.

Step 103: a handset TV server at the transmitting terminal splits the service data of the split program into audio sub-service data and video sub-service data, and respectively transmits the audio sub-service data and the video sub-service data to the multiplexer.

Step 104: the multiplexer respectively packages the received audio sub-service data and video sub-service data, and transmits them to the air through respective transmission resources.

Step 105: after receiving the ESG/EPG, the terminal stores the ESG/EPG, and resolves the association relationship information. For the split program, the user is allowed to select to only listen to the audio, only watch the video, or play both the audio and the video simultaneously.

Step 106: the user selects to watch the split program, and if the user selects to only watch the video, then the terminal configures the transceiver and the software module to only receive and play the video sub-service data according to the transmission resource information of the video sub-service.

Step 107: if the user selects to only listen to the audio, then the terminal configures the transceiver and the software module to only receive and play the audio sub-service data according to the transmission resource information of the audio sub-service.

Step 108: if the user selects to play the audio and the video simultaneously, then the terminal configures the transceiver and the software module to receive the video sub-service data and the audio sub-service data according to the transmission resource information of the audio sub-service and video sub-service, and to simultaneously play both of which according to synchronization information.

For the split program, in the condition that the audio and the video are played simultaneously, if the user performs switching operation, such as silencing operation or video shut down, then the terminal configures the transceiver and the software module to only receive and play the audio sub-service data or the video sub-service data according to the user's selection.

Figure 2:
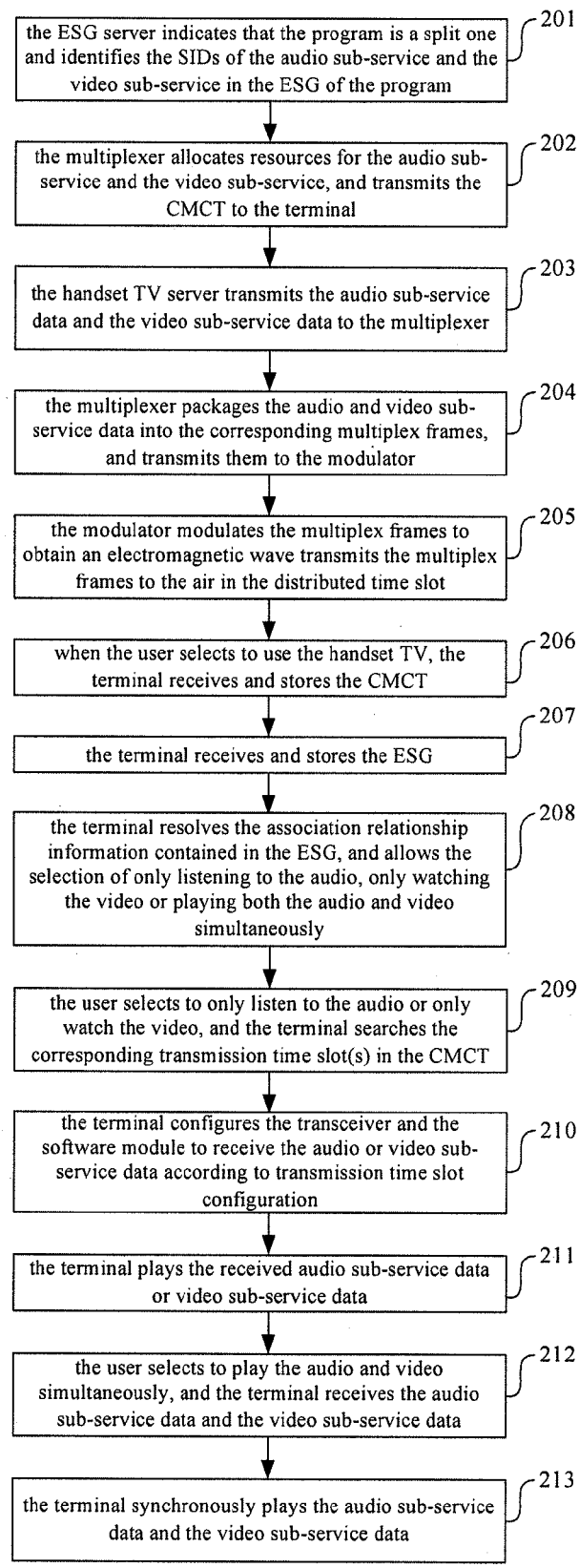
FIG. 2 is a flow chart of one embodiment of the present invention.

The method of the present invention will be further described taking the implementation of the present invention in the CMMB as an embodiment. FIG. 2 shows the method for transmitting the service data of the handset TV in the CMMB according to the embodiment of the present invention. Take an example of splitting a program with the service ID (SID) of 601, the method includes the following steps.

Step 201: the ESG server carries association relationship information in the guide information of the program with the SID of 601, the association relationship information contains an identifier indicating whether the program is a split one, if yes, the association relationship information also contains the SID of the audio sub-service and the SID of the video sub-service; the ESG server transmits the ESG to the multiplexer, the multiplexer packages the ESG into a multiplex frame and then transmits it to a modulator, and the modulator modulates the multiplex frame packaged with the ESG to an electromagnetic wave and then transmit it to the air by a transmission device.

The association relationship information in the embodiment employs the combined announcement.

A service split indication field (split field) for identifying whether the program is a split program, an audio sub-service ID (AudioSID) field for identifying the SID of the audio sub-service, a video sub-service ID (VideoSID) field for identifying the SID of the video sub-service are added into the ESG XML of the program with the SID of 601.

In the embodiment, the value of the split field is set as "true" to identify that the program is a split one, and the value of the AudioSID field is set as 6011, the value of the VideoSID field is set as 6012, so as to respectively identify that the SID of the audio sub-service is 6011, the SID of the video sub-service is 6012, and the audio sub-service with the SID of 6011 and the video sub-service with the SID of 6012 have an association relationship.

Step 202: the multiplexer allocates resources for the audio sub-service and the video sub-service, respectively records the transmission time slot information of the audio sub-service and the video sub-service in the CMCT, and transmits the CMCT to the air through the modulator.

It is assumed that the program with the SID of 601 occupies one multiplex sub-frame in one multiplex frame, and is transmitted in time slots 3, 4, 5, and 6 in the prior art; in the present embodiment, it is assumed that the resource allocated by the multiplexer for the audio sub-service with the SID of 6011 is that the audio sub-service occupies multiplex sub-frame 1 of multiplex frame 2 and the audio sub-service is transmitted in time slot 3; and the resource allocated by the multiplexer for the video sub-service with the SID of 6012 is that the video sub-service occupies multiplex sub-frame 1 of multiplex frame 3 and the video sub-service is transmitted in time slots 4, 5, and 6. The video sub-service occupies a larger bandwidth due to its larger data volume.

Step 203: the handset TV server splits the service data of the program with the SID of 601 into audio sub-service data and video sub-service data, and respectively transmits the audio sub-service data and the video sub-service data to the multiplexer.

Step 204: the multiplexer packages the received audio sub-service data into an audio segment of multiplex sub-frame 1 of multiplex frame 2, the received video sub-service data into a video segment of multiplex sub-frame 1 of multiplex frame 3, and transmits multiplex frames 2 and 3 to the modulator.

Step 205: the modulator modulates multiplex frames 2 and 3 to obtain an electromagnetic wave and respectively transmits the electromagnetic wave in time slot 3 and in time slots 4, 5, and 6.

Step 206: when the user selects to use the handset TV, the terminal receives and stores the CMCT.

The CMCT records not only the time slot resources occupied by individual services but also decoding parameters of individual services.

Step 207: the terminal receives and stores the ESG.

Apart from the association relationship information, the ESG also contains a part of player configuration parameters.

Step 208: the terminal resolves the association relationship information contained in the ESG, and allows the user to select to only listen to an audio, only watch a video and play both of the audio and the video simultaneously when the program is a split one.

Step 209: when the user selects to only listen to the audio or only watch the video, the terminal searches the transmission time slot information of the audio or video sub-service in the CMCT according to the SID of the audio or video sub-service selected by the user.

Step 210: the terminal configures the transceiver and the software module to receive the electromagnetic signal of the audio or video sub-service data in the specified time slot according to the searched transmission time slot information of the audio or video sub-service, demodulates the electromagnetic signal to obtain a multiplex frame, and demultiplexes the multiplex frame to resolve it and obtain the audio sub-service data or video sub-service data.

Step 211: the terminal configures the player according to the player configuration parameters and decoding parameters in the ESG, and plays the audio sub-service data or the video sub-service data.

Step 212: if the user selects to play the audio and video simultaneously, the terminal searches the transmission time slot information of the audio sub-service and the video sub-service in the CMCT according to the SIDs of the audio sub-service and the video sub-service, configures the transceiver and the software module to receive the electromagnetic signals of the audio sub-service and the video sub-service, demodulates the electromagnetic signals to obtain a multiplex frame, and demultiplexes the multiplex frame to resolve it and obtain the audio sub-service data and the video sub-service data.

Step 213: the terminal configures the player according to the player configuration parameters and service decoding parameters in the ESG, and plays the audio sub-service data and the video sub-service data.

If the user selects to only listen to the audio or only watch the video, it is required to perform self-synchronization during the play process; if the user selects to play the audio and the video simultaneously, it is also required to realize the synchronization between the audio sub-service and the video sub-service according to the synchronization information carried in the ESG.

Obviously, those skilled in the art shall understand that the above-mentioned modules and steps of the present invention can be realized by using calculating device of general purpose, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only preferred embodiments of the present invention, which are not used to restrict the present invention. For those skilled in the art, the present invention may have various changes and variations. Any amendments, equivalent substitutions, improvements etc. within the spirit and principle of the present invention are all included in the scope of the present invention.

What is claimed is:

1. A method for transmitting service data of a handset TV, comprising:

splitting an audio part and a video part of a handset TV program into an audio sub-service and a video sub-service respectively, and when transmitting the service data of the handset TV program, a transmitting terminal splitting the service data into audio sub-service data and video sub-service data; the transmitting terminal packaging the audio sub-service data and the video sub-service data into different multiplex frames respectively;

the transmitting terminal transmitting at least one multiplex frame packaged with the audio sub-service data on a transmission time-slot and transmitting at least one other multiplex frame packaged with the video sub-service data on another transmission time slot different from the transmission time slot in which the audio sub-service was transmitted, and transmitting association relationship information of the audio sub-service and the video sub-service to a terminal;

the transmitting terminal packages the audio sub-service data and the video sub-service data into different multiplex frames, and the multiplex frame packaged with the audio sub-service data and the multiplex frame packaged with the video sub-service data are transmitted respectively in different transmission time slots;

wherein, the transmission resource information comprises transmission time slot information of the audio sub-service data and transmission time slot information of the video sub-service data, the transmitting terminal transmits the transmission resource information to the terminal through a continuous-service multiplex configuration table (CMCT); when the user selects to only listen to the audio or only watch the video, the terminal searches the transmission time slot information of the audio sub-service data or the video sub-service data in the CMCT according to the service ID of the audio sub-service or the video sub-service contained in the association relationship information, and only receives the audio sub-service data or only receives the video sub-service data according to the transmission time slot information; when the user selects to play the audio and the video simultaneously, the terminal searches the transmission time slot information of the audio sub-service data and the video sub-service data in the CMCT according to the service IDs of the audio sub-service and the video sub-service contained in the association relationship information, and receives the audio sub-service data and the video sub-service data respectively according to the transmission time slot information.

2. The method according to claim 1, wherein, when the terminal receives the service data of the program, if a user selects to only listen to an audio or only watch a video, then the terminal only receives the audio sub-service data or only receives the video sub-service data according to the received association relationship information;

if the user selects to play the audio and the video simultaneously, the terminal receives both the audio sub-service data and the video sub-service data according to the received association relationship information.

3. The method according to claim 2, wherein, the transmitting terminal transmits transmission resource information of the audio sub-service and the video sub-service to the terminal before respectively transmitting the audio sub-service data and the video sub-service data, and the terminal receives the audio sub-service data and/or the video sub-service data according to the transmission resource information.

4. The method according to claim 3, wherein, the association relationship information employs a separate announcement or a combined announcement, wherein the separate announcement means that the audio sub-service and the video sub-service are respectively configured with guide information, an audio attribution and the video sub-service associated with the audio sub-service are indicated in the guide information of the audio sub-service, while a video attribution and the audio sub-service associated with the video sub-service are indicated in the guide information of the video sub-service;

the combined announcement means that the program is configured with combined guide information, wherein whether the audio part and the video part of the program are split into the audio sub-service and the video sub-service is indicated in the combined guide information, if yes, the combined guide information further comprises service IDs for the audio sub-service and the video sub-service to identify the association relationship.

5. The method according to claim 4, wherein, when the user selects to play the audio and the video simultaneously, during the process of playing the program, if the user performs a silencing operation, the terminal only receives the video sub-service data according to the transmission resource information of the video sub-service data and plays the video sub-service data;

if the user selects to shut down the video, the terminal only receives the audio sub-service data according to the transmission resource information of the audio sub-service data and plays the audio sub-service data.

6. The method according to claim 5, wherein, the association relationship information is contained in an electronic service guide (ESG), and an audio sub-service ID field is added in the ESG to indicate the service ID of the audio sub-service; a video sub-service ID field is added to indicate the service ID of the video sub-service; and a service split indication field is added in the ESG to indicate whether the audio part and the video part of the program are split into the audio sub-service and the video sub-service.

7. A method for receiving service data of a handset TV, comprising:

when a terminal receives the service data of a handset TV program, wherein the audio sub-service data and the video sub-service data into are packaged into different multiplex frames respectively, if a user selects to only listen to an audio or only watch a video, then the terminal only receiving multiplex frames packaged with respectively transmitted audio sub-service data or video sub-service data of the program according to received association relationship information, wherein the audio sub-service data is transmitted on at least one multiplex frame during a transmission time slot and the video sub-service data is transmitted on at least one other multiplex frame during another transmission time slot different from the transmission time slot in which the audio sub-service was transmitted;

if the user selects to play the audio and the video simultaneously, the terminal receiving both the audio sub-service data and the video sub-service data of the program according to the received association relationship information, and only receives the audio sub-service data or only receives the video sub-service data according to the transmission time slot information; when the user selects to play the audio and the video simultaneously, the terminal searches transmission time slot information of the audio sub-service data and the video sub-service data in the CMCT according to service IDs of the audio sub-service and the video sub-service contained in the association relationship information, and respectively receives the audio sub-service data and the video sub-service data according to the transmission time slot information.

* * * * *